United States Patent Office 3,234,105
Patented Feb. 8, 1966

3,234,105
METHOD FOR PRODUCING 2-KETO-L-GULONIC ACID
Kazuwo Motizuki, Isoshi, Takarazuka, Toshihiko Kanzaki, Itami, Hisayoshi Okazaki, Suita, Hiroshi Yoshino, Miyakojima-ku, Osaka, and Kiyoshi Nara and Masao Isono, Nishinomiya, and Itaru Nakanishi, Higashisumi-Yoshi-ku, Osaka, and Kenichi Sasajima, Nishinomiya, Japan, assignors to Takeda Chemical Industries, Ltd., Osaka, Japan
No Drawing. Filed Sept. 18, 1963, Ser. No. 309,847
Claims priority, application Japan, Sept. 20, 1962, 37/41,487
20 Claims. (Cl. 195—49)

The present invention relates to a method for producing 2-keto-L-gulonic acid which serves as an intermediate for the production of the physiologically important L-ascorbic acid, well known as vitamin C, and more particularly to the 2-keto-L-gulonic acid production which comprises transforming sorbitol to 2-keto-L-gulonic acid by the action of the enzyme system of a microorganism selected from the genus Pseudomonas or the genus Acetobacter.

2-keto-L-gulonic acid may be produced from D-glucose through sorbitol, L-sorbose, diacetone sorbose and diacetone 2-keto-L-gulonic acid as the intermediates by the Reichstein method, or through 5-keto-D-gluconic acid and L-idonic acid by the Gray method. These methods, however, must pass through several reaction steps. This renders the above processes unsatisfactory from industrial point of view as these are difficult in working as a continuous process.

One object of the present invention is to provide a process wherein the production of 2-keto-L-gulonic acid can be effected without the said disadvantage. In other words, an object of the invention lies in the embodiment of a process which comprises transforming sorbitol to 2-keto-L-gulonic acid through only one step by the action of the microbial enzyme system.

Another object of the present invention is to provide microorganisms which produce the enzyme system capable of transforming sorbitol to 2-keto-L-gulonic acid.

Still another object of the present invention is to provide a method for the production of ascorbic acid by subjecting the ester prepared from 2-keto-L-gulonic acid to enolization and lactonization, which results in a good yield.

Pseudomonas and Acetobacter, in the present specification, are the names of genera belonging to the family Pseudomonadaceae and the order Pseudomonadales, the classification being in accordance with that in "Bergey's Manual of Determinative Bacteriology, seventh edition, 1957," by Robert S. Breed, E. G. D. Murray and Nathan R. Smith, published by The Williams & Wilkins Company, United States of America.

The microorganisms to be employed for the production of the enzyme system capable of transforming sorbitol to 2-keto-L-gulonic acid are those belonging to genera Pseudomonas and Acetobacter. More specifically, some examples are mentioned in the following:

*Acetobacter melanogenum*, ATCC 15163 (IFO 3292)
*Acetobacter* sp., ATCC 15164*
*Acetobacter rubiginosus*, IFO 3243
*Acetobacter suboxydans*, NRRL B-72
*Acetobacter gluconicus*, ATCC 9324
*Acetobacter xylinum*, ATCC 10245
*Acetobacter albidus*, IFO 3250
*Acetobacter albidus*, IFO 3251
*Acetobacter albidus*, IFO 3253
*Acetobacter suboxydans*, IFO 3255
*Acetobacter industrius*, IFO 3260
*Bacterium orleanense*, IFO 3259
*Acetobacter cerinus*, IFO 3263
*Acetobacter cerinus*, IFO 3264
*Acetobacter cerinus*, IFO 3265
*Acetobacter cerinus*, IFO 3266
*Acetobacter cerinus* var. *ammoniacus*, IFO 3267
*Acetobacter cerinus* var. *ammoniacus*, IFO 3269
*Acetobacter cerinus*, IFO 3268
*Pseudomonas striafaciens*, IFO 3309
*Pseudomonas coronafaciens*, IFO 3310
Pseudomonas sp., ATTC 15165*

NOTE.—*Bacterium orleanense* belongs to the genus Acetobacter according to the classification system of Bergey's Manual of Determinative Bacteriology.
NOTE.—* denotes new strain.

Numbers and abbreviations attached to the names of microorganisms in this specification show the respective accession numbers to the strain in Northern Utilization Research Branch, U.S. Department of Agriculture, Peoria, Ill., U.S.A. (NRRL) or American Type Culture Collection, Washington, D.C., U.S.A. (ATCC), or Institute for Fermentation, Osaka, Japan (IFO).

Determination of species name is, however, sometimes complicated and entangled. At any rate, the microorganisms capable of producing the enzyme system causing transformation of sorbitol to 2-keto-L-gulonic acid, which belong to the genus Pseudomonas or genus Acetobacter according to the classification by Bergey's Manual of Determinative Bacteriology, are all involved in what is called genus Pseudomonas or genus Acetobacter in this specification, even if they may come under other generic names in other nomenclatures.

Microorganisms, which are employed in the method of this invention, are all available in known culture collections, such as Centraalbureau voor Schimmelcultures, Holland, or Institute for Fermentation, Osaka, Japan, or Northern Utilization Research Branch, U.S. Department of Agriculture, Peoria, Illinois, or American Type Culture Collection, Washington, D.C., or National Collection of Industrial Bacteria, Teddington, England. Or their wild cultures can easily be obtained from flowers, fruits, soil, etc.

The above-mentioned microorganisms can be induced to mutants having superior ability relative to the parent wild strains of producing the enzyme system capable of transforming sorbitol to 2-keto-L-gulonic acid. Such mutation can be caused by treating a wild strain with a mutagen such as ultraviolet rays irradiation, X-ray irradiation or contact with nitrous acid, or by isolating a clone occurring by spontaneous mutation. These means for inducing the desired mutation on a wild type strain may be effected in any of the ways per se well known for this purpose by the skilled in the art and which have been described in many publications, for example, "Methods in Medical Research," volume 3, edited by R. W. Gerard, published by the Year Book Publishers, Inc., Chicago, U.S.A., in 1950, and "Nature," volume 183, page 1829 (1959), reported by F. Kaudewitz.

The characteristics of the aforementioned new strains are shown in the following enumerations:

CHARACTERISTICS OF ACETOBACTER SP.
ATCC 15164

Rods, occurring singly or pairs. Sometimes, the rods become of filamentous involution form. Gram negative non-motile.
Henneberg's Janke's, Hayduck's and Beijerinck's synthetic aqueous media: no growth.
Agar slant: glistening, smooth.
Gelatin: liquefied.
Assimilate peptone but not ammonium salts.
Optimum pH for growth: 6.0–6.4.
Do not oxidize acetic acid.

Oxidize glucose to gluconic acid, 2-keto-gluconic acid and 2,5-diketo-gluconic acid.
Oxidize mannitol to fructose and further to kojic acid.
Form acid from maltose and ethanol.

CHARACTERTERISTICS OF PSEUDOMONAS SP. ATCC 15165

Rods, 0.6–0.9 by 1.2–1.8 microns. Endspore not formed. Gram negative, motile, fragella pollar.
Agar colony: circular, smooth, entire, convex, translucent.
Agar streak: moderate growth, filiform, glistening, medium color unchanged.
Potato streak: abundant growth, filiform, glistening, cell color changes to yellow, brown and dark brown.
Gelatin stab: best growth at top, filiform, no liquefaction (four weeks).
Nutrient broth: surface growth none, clouding moderate, flaky sediment.
Peptone water: surface growth none, clouding slight, sediment scanty.
Indol not produced.
Hydrogen sulfide produced.
Starch not hydrolyzed.
Nitrites not produced from nitrates.
Ammoniam not produced.
Methyl red positive, Voges-Proskauer tests negative.
Litmus milk: acidic, coagulate.
Catalase: positive.
Optimum temperature for growth: about 28° C.
Optimum pH for growth: 6.0–6.5.
Acids from arabinose, xylose, glucose, fructose, galactose, mannose, sucrose, glycerol.
No acid from sorbose, lactose, maltose, treharose, raffinose, starch, inulin, dextrin, mannitol, sorbitol ethanol.
No gas from these sugars.

In carrying out the method of the present invention, the following two processes are conveniently employed: (1) A microorganism is cultured in a medium containing sorbitol and other appropriate nutrients and (2) after cultivation, the whole culture, the cells collected from the culture, or enzyme preparations obtained from the cells by means of conventional methods in enzymology are brought into contact with sorbitol.

In the case of the process (1) described above, the microorganism may be cultured in an aqueous medium in aerated fermentor. The cultivation should be conducted at pH values between about 4 to 9, but preferably between about 5 to 8. A preferred temperature is from about 20 to 30° C., especially from about 25 to 30° C. While the time for the cultivation varies with the kind of microorganisms and nutrient media to be used, about 3 to 10 day cultivation may usually bring most preferable yield.

The concentration of sorbitol in the medium varies with the kind of microorganisms, but is it generally desirable to be about 1 to 200 grams/liter, most preferably about 5 to 100 grams/liter.

It is usually required that the culture medium contains such nutrients for the microorganism as assimilable carbon sources, digestible nitrogen sources, and preferably inorganic substances, vitamins, trace elements, other growth promoting factors, etc. Sorbitol per se serves as the carbon source, but the following substances may also be used as auxiliary carbon sources: starch, cane sugar, lactose, dextrin, glycerol, maltose, etc. They are employed at a concentration from about 1 gram/liter to 10 grams/liter. As the nitrogen sources there may be used various organic or inorganic substances such as soybean meal, meat extracts, peptone, casein, yeast extracts, corn steep liquor, urea, nitrates, ammonium salts, etc. As the inorganic nutrients, for example, potassium phosphates, magnesium sulfate, ferrous and ferric chlorides, calcium carbonate, etc. are usually employed. As the constituents of the medium vary also with the kind of microorganisms to be employed, it is preferable to choose a proper medium case by case.

In the case of the process (2), the microorganism may by cultured under similar conditions to the process (1). Substances mentioned above are also used for nutrients. About 1 to 2 days culture is usually preferable for obtaining most advantageous cells for the production of 2-keto-L-gulonic acid from sorbitol. Then, in one case, sorbitol per se or its aqueous solution is added into the cultured medium to make its final concentration from about 1 gram/liter to about 200 grams/liter. The mixed solution may be incubated for about one day under the same conditions as in the case of the preceding cultivation. In another case, the cells may be collected by centrifugation from the culture broth and resuspended in an aqueous medium bufferized with phosphates, tris(hydroxymethyl)aminomethane, etc. at a pH from about 5 to 8. Then sorbitol is added in the same way as mentioned above. The succeeding incubation may be effected under similar conditions as those described above.

In the method of the present invention, the resulting 2-keto-L-gulonic acid in the reaction mixture need not be isolated, but the reaction mixture can directly be esterified, followed by enolization and lactonization, and can be led to L-ascorbic acid. In case of isolating the objective 2-keto-L-gulonic acid from the reaction mixture, however, the isolation may desirably be effected as its salt form or by utilizing differences between the product and impurities in such properties as solubility, adsorbability, distribution coefficient between two solvents. Use of an adsorbent such as ion exchange resin is one of the most convenient processes for the isolation of the product. Since the 2-keto-L-gulonic acid thus obtained is, in general, not pure, it may be purified by conventional methods such as recrystallization, and chromatography.

As stated above, 2-keto-L-gulonic acid can be led to L-ascorbic acid by application of any of the known methods, if desired. L-ascorbic acid is generally synthesized by esterifying 2-keto-L-gulonic acid in the presence of a mineral acid such as sulfuric acid, hydrochloric acid or strongly acidic cation exchange resin, as a catalyst, followed by enolizing the ester and subsequently lactonizing the enol compound.

The preferred strongly acidic cation exchange resins which can be employed for esterification of 2-keto-L-gulonic acid may be either sulfonated phenolic, or sulfonated polystyrene resins; the size of particles, the degree of cross-linking, and the ion exchange capacity are of little significance in carrying out the present invention. Thus, by way of example, Amberlite IR–120, Amberlite IR–112, Amberlite XE–69, etc. (Rohm & Haas Co., Inc., Philadelphia, Pennsylvania, U.S.A.), Dowex 50, Dowex-50W (Dow Chemical Co., Inc., Midland, Michigan, U.S.A.), Duolite C–3 (Chemical Process Co., Inc., Redwood City, California, U.S.A.), and Diaion SK–1 (Mitsubishi Chemical Industries, Limited, Tokyo, Japan), are those which can be advantageously employed for the purpose stated.

The resulting ester in the reaction mixture need not be separated, but the reaction mixture can directly be subjected to enolization and lactonization. For the enolization and lactonization, any of the known methods are applicable. Among such methods, there are included the method wherein the reaction product (ester) is heated in a neutral solvent, the method wherein the reaction product (ester) is heated in the presence of anion exchange resin, metal powder, sodium alcoholate, salt of a weak acid such as sodium hydrogen carbonate, sodium carbonate and calcium carbonate, or the method wherein the reaction product (ester) is heated in an acidic solvent such as hydrochloric acid. Above all, the methods in which the reaction product (ester) is heated in the presence of anion exchange resin are most preferred, because by employing such methods it is made possible to effect esterification process, enolization process and lactonization process in a continuous manner. Among the anion exchange resins which can be used for enolization and lactonization of 2-keto-L-gulonic acid ester, there may, for example, be enumerated Amberlite IRA–400, Amberlite IRA–410, Amberlite XE–168, Amberlite IR–45, etc. (Rohm & Haas Co., Inc., Philadelphia, Pennsylvania, U.S.A.), Dowex-1, and Dowex-2 (Dow Chemical Co., Inc., Midland, Michigan, U.S.A.).

In case thus obtained L-ascorbic acid is in a form of salt such as sodium salt, calcium salt, etc., it may, if desired, be converted to the free form by hydrolyzing with an acid, such as hydrochloric acid.

The present invention will now be described in further particularity by means of the following illustrative examples. It will be understood, of course, that the invention is not limited to the particular details of these examples since they only set forth preferred exemplary embodiments of the invention. In these examples, all percentages are on a weight basis, unless otherwise noted. Temperatures are all uncorrected, and abbreviations "g.," mg.," "l.," and "ml." mean gram(s), milligram(s), liter(s) and milliliter(s), respectively.

*Example 1*

Cells of a selected strain of Acetobacter sp., ATCC 15164, grown on a sorbitol-yeast extract agar slant, for 2 days at 28° C. were suspended in sterile water. 1 ml. of this cell suspension was inoculated into a 1 l. shake flask containing 150 ml. of the following aqueous medium, previously sterilized in an autoclave at 15 lbs. per square inch steam pressure:

|  | Percent |
|---|---|
| Sorbitol | 2.0 |
| Glucose | 0.5 |
| Yeast extract | 0.5 |
| CaCO$_3$ | 1.0 |

Incubation was maintained at 28° C. with shaking for 7 days. The culture broth was treated with 50 g. of activated carbon and filtered. Then the filtrate was passed over Amberlite IR–120 cation exchange resin. The passed solution was concentrated in vacuo and then crude crystalline 2-keto-L-gulonic acid was obtained.

The crude crystalline product had a melting point of 160° C., but the recrystallized sample and its methyl ester showed identical physical characteristics (e.g. melting point, infra-red absorption spectrum etc.) with authentic 2-keto-L-gulonic acid and its methyl ester.

Free acid melting point: 165–166° C.

Elemental analysis for $C_6H_{10}O_7 \cdot H_2O$: Calculated: C, 34.01%; H, 5.7%. Found: C, 34.74%; H, 5.29%.

Methyl ester melting point: 154–155° C.

Elemental analysis for $C_7H_{12}O_7$: Calculated: C, 40.28%; H, 5.62%. Found: C, 40.3%; H, 5.6%.

*Example 2*

One loopful of cells of a selected strain of Acetobacter sp., ATCC 15164, were inoculated into a shake flask containing 500 ml. of the following aqueous inoculum medium and incubated at 30° C. with shaking for 18 hours:

|  | Percent |
|---|---|
| Sorbitol | 2 |
| Glucose | 0.5 |
| Yeast extract | 0.5 |

A basal medium was prepared for actual production of 2-keto-L-gulonic acid. This medium had the following composition:

|  | Percent |
|---|---|
| Sorbitol | 5.0 |
| Glucose | 0.5 |
| Yeast extract | 0.5 |
| CaCO$_3$ | 2.0 |

500 ml. of the incubated inoculum was added to 30 l. of the above medium in a fermentor having a total volume of 50 l.

Incubation was conducted at 28–29° C. with stirring at the rate of 280 r.p.m., with aeration at the rate of 15–24 liters per minute, and with inner pressure at 15–20 lbs. per square inch. After 150 hours' incubation, yield of the product, 2-keto-L-gulonic acid, attained to about 500 mg. per 100 ml. of the culture broth. Cells and solid materials in the culture broth were discarded by centrifugation and about 27 liters of the clear filtrate was obtained. 1 liter of the filtrate was decolorized with 50 g. of activated carbon and passed over Amberlite IR–120 resin and then concentrated in vacuo. The yield of 2-keto-L-gulonic acid was about 4.3 g. per liter of the filtrate.

*Example 3*

Cells of a selected strain of Acetobacter cerinus, IFO 3266, grown on sorbitol-yeast extract agar slant, for 2 days at 28° C. were suspended in 10 ml. of sterile water. 5 ml. of this cell suspension was inoculated into a one l. shake flask containing 150 ml. of the following aqueous medium, previously sterilized in an autoclave at 15 lbs. per square inch steam pressure:

|  | Percent |
|---|---|
| Sorbitol | 5 |
| Glucose | 0.5 |
| Yeast extract | 0.5 |
| CaCO$_3$ | 2.0 |

Incubation was maintained at 28° C. with shaking at the rate of 225 r.p.m. for 10 days. The culture broth was filtered and the filtrate was passed over Amberlite IR–120 resin. The product, 2-keto-L-gulonic acid, was then adsorbed on Amberlite IR–45 resin. After washing the column with water, the product was eluted with 1 N potassium hydroxide and the eluate was concentrated and decolorized with activated carbon. The decolorized solution was again passed over Amberlite IR–120 resin and the passed solution was concentrated with flash evaporator. 4.7 g. of the crude 2-keto-L-gulonic acid was obtained from the broth collected from 10 shake flasks.

*Example 4*

One loopful of cells of a mutant strain of Acetobacter suboxydans, NRRL B–72, were inoculated into a 200 ml. shake flask containing 15 ml. of the following aqueous medium and incubated on a rotary shaker at 28° C.:

|  | Percent |
|---|---|
| Sorbitol | 2.0 |
| Polypeptone | 0.1 |
| Casamino acids | 0.25 |
| Glycerol | 0.1 |
| KH$_2$PO$_4$ | 0.05 |
| MgSO$_4 \cdot$7H$_2$O | 0.05 |

During cultivation a small amount of the culture broth was taken out from the shake flask at alternate day intervals and chromatographed with the solvent system: phenol saturated with water. The area of paper corresponding to 2-keto-L-gulonic acid was cut off and eluted with water. The eluted solution was treated with the Somogyi-Nelson reagents to evaluate the amount of 2-keto-L-gulonic acid produced.

Result obtained as follows:

| Days | 3 | 5 | 7 |
|---|---|---|---|
| 2-keto-L-gulonic acid (μg./ml.) | 120 | 1,850 | 2,100 |

*Example 5*

A mutant strain of Acetobacter suboxydans, NRRL B–72, was rinsed from an agar slant into a 2 l. shake flask containing 500 ml. of the following aqueous medium:

|  | Percent |
|---|---|
| Sorbitol | 2 |
| Glycerol | 0.01 |
| Polypeptone | 0.05 |
| Yeast extract | 1.0 |
| $KH_2PO_4$ | 0.003 |
| $K_2HPO_4$ | 0.007 |
| $MgSO_4 \cdot 7H_2O$ | 0.001 |
| $FeSO_4 \cdot 7H_2O$ | 0.001 |

The flask incubated at 28° C. with shaking for 48 hours and this was served as the inoculum. 500 ml. of the incubated inoculum was added to 30 l. of the above medium in a fermentor having a total volume of 50 l. Incubation was conducted at 28° C. with stirring at the rate of 260 r.p.m. and with aeration at the rate of 30 l. per minute. The progress of the reaction was followed by taking out a small amount of the broth and estimating the 2-keto-L-gulonic acid content as described in Example 4.

Result obtained as follows:

| Days | 3 | 5 | 7 | 10 |
|---|---|---|---|---|
| 2-keto-L-gulonic acid (μg./ml.) | 130 | 2,200 | 2,500 | 2,500 |

25 l. of the broth was filtered by the aid of Hyflo Super-Cel and the filtrate was passed over Amberlite IR-200 ($H^+$ type) resin. The acidic fraction was then adsorbed on Dowex XE-168 resin and eluted with 1 N ammonium hydroxide. The eluate was concentrated in vacuo and decolorized with activated carbon. The pH was adjusted to about 1.5 by further treatment with Amberlite IR-200 resin and then calcium hydroxide was added to pH of 6.0-6.5. After filtering, pH of the filtrate was again adjusted to 1.5 with Amberlite IR-200 resin. Then 2-keto-L-gulonic acid was adsorbed on Dowex XE-168 resin and eluted with 0.1 N ammonium hydroxide. The eluate was concentrated in vacuo and then 45 g. of crystalline 2-keto-L-gulonic acid was obtained. The physical characteristics of this crystalline product were identical with those of authentic 2-keto-L-gulonic acid.

Example 6

The following organisms were incubated as described in Example 4, and the production of 2-keto-L-gulonic acid was ascertained by paperchromatography with the solvent system: phenol saturated with water.

Acetobacter suboxydans, NRRL B-72
Acetobacter gluconicus, ATCC 9324
Acetobacter xylinum, ATCC 10245
Acetobacter albidus, IFO 3250
Acetobacter albidus, IFO 3251
Acetobacter albidus, IFO 3253
Acetobacter suboxydans, IFO 3255
Acetobacter industrius, IFO 3260
Bacterium orleanense, IFO 3259
Acetobacter cerinus, IFO 3263
Acetobacter cerinus, IFO 3264
Acetobacter cerinus, IFO 3265
Acetobacter cerinus var. ammoniacus, IFO 3267
Acetobacter cerinus var. ammoniacus, IFO 3269
Acetobacter cerinus, IFO 3268

Example 7

A selected strain of *Pseudomonas striafaciens*, IFO 3309, was incubated as described in Example 1, and the following result was obtained:

| Days | 3 | 5 | 7 |
|---|---|---|---|
| 2-keto-L-gulonic acid (μg./ml.) | 500 | 1,600 | 1,800 |

Example 8

A selected strain of *Pseudomonas striafaciens*, IFO 3309, which was used in Example 7 was incubated as described in Example 5, substituting the following media for the media used in Example 5.

Medium for inoculum culture:

|  | Percent |
|---|---|
| Sorbitol | 2.0 |
| Yeast extract | 0.5 |

Basal medium for fermentor:

|  | Percent |
|---|---|
| Sorbitol | 5.0 |
| Yeast extract | 0.5 |
| polypeptone | 0.2 |
| $K_2HPO_4$ | 0.1 |
| $MgSO_4 \cdot 7H_2O$ | 0.5 |

During cultivation a sample of the culture broth was taken out from the fermentor at alternate day intervals and the amount of 2-keto-L-gulonic acid was estimated by the method described in Example 4.

Result obtained as follows:

| Days | 3 | 5 | 7 |
|---|---|---|---|
| 2-keto-L-gulonic acid (μg./ml.) | 170 | 1,500 | 3,600 |

53 g. of crystalline 2-keto-L-gulonic acid was obtained in the same way as Example 5. The physical characteristics of the crystalline product were identical with those of authentic 2-keto-L-gulonic acid.

Example 9

One loopful of cells of *Pseudomonas striafaciens*, IFO 3309, were inoculated with a shake flask containing the following medium and incubated on a rotary shaker at 28° C.:

|  | Percent |
|---|---|
| Sorbitol | 2.0 |
| Glycerol | 0.01 |
| Polypeptone | 0.05 |
| Cornsteep liquor | 1.0 |
| $KH_2PO_4$ | 0.003 |
| $K_2HPO_4$ | 0.007 |
| $MgSO_4 \cdot 7H_2O$ | 0.001 |
| $FeSO_4 \cdot 7H_2O$ | 0.001 |
| NaCl | 0.005 |

And the production of 2-keto-L-gulonic acid was ascertained by paperchromatography with the solvent system: phenol saturated with water.

The same result was obtained when cells of *Pseudomonas coronafaciens*, IFO 3310, or of *Pseudomonas sp.*, ATCC 15165, were employed in lieu of the cells of *Pseudomonas striafaciens*.

Example 10

One loopful of cells of a selected strain of *Acetobacter melanogenus*, ATCC 15163, was inoculated into a shake flask containing 500 ml. of the following aqueous inoculum medium and incubated at 30° C. with shaking for 18 hours:

|  | Percent |
|---|---|
| Sorbitol | 2.0 |
| Glucose | 0.5 |
| Yeast-extract | 0.5 |

A basal medium was prepared for actual production of 2-keto-L-gulonic acid.

This medium had the following composition:

|  | Percent |
|---|---|
| Sorbitol | 5.0 |
| Glucose | 0.5 |
| Yeast extract | 0.5 |
| $CaCO_3$ | 2.0 |

500 ml. of the incubated inoculum was added to 30 l. of the above medium in a stainless fermentor having a total volume of 50 l. Incubation was conducted at 28–29° C. with stirring at the rate of 280 r.p.m. with aeration at the rate of 15–24 liters per minute, and with inner pressure at 15–20 lbs. per square inch. After 150 hours' incubation, the product, 2-keto-L-gulonic acid, was attained to about 650 mg. per 100 ml. in the broth. Cells and solid fraction of the broth were discarded by a Sharples type centrifuge and about 27 liters of the clear filtrate were obtained. 1 liter of the filtrate was decolorized with 50 g. of activated carbon and passed over Amberlite IR–120 resin and then concentrated in vacuo. The yield of crystalline 2-keto-L-gulonic acid was about 5.3 g. per liter of the filtrate.

Example 11

One loopful of cells of a strain of the Pseudomonas sp., ATCC 15165, was inoculated into a shake flask containing 500 ml. of the following aqueous inoculum medium and incubated at 30° C. with shaking for 18 hours:

| | Percent |
|---|---|
| Sorbitol | 2.0 |
| Glucose | 0.5 |
| Yeast extract | 0.5 |

A basal medium was prepared for production of 2-keto-L-gulonic acid. The medium had the following composition:

| | Percent |
|---|---|
| Sorbitol | 5.0 |
| Glucose | 0.5 |
| Yeast extract | 0.5 |
| $CaCO_3$ | 2.0 |

500 ml. of the incubated inoculum was added to 30 l. of the above medium in a stainless fermentor having a total volume of 50 l. Incubation was conducted at 28–29° C. with stirring at the rate of 280 r.p.m., with aeration at the rate of 15–24 liters per minute, and with inner pressure of 15–20 lbs. per square inch. After 150 hours' incubation, the product, 2-keto-L-gulonic acid was attained in an amount of about 120 mg. per 100 ml. in the broth. Cells and solid fraction of the broth were discarded by a Sharples type centrifuge and about 27 liters of the clear filtrate were obtained. 1 liter of the filtrate was decolorized with 50 g. of activated carbon and passed over Amberlite IR–120 resin and then concentrated in vacuo. The yield of crystals of 2-keto-L-gulonic acid was about 0.97 g. per liter of the filtrate.

Example 12

One loopful of cells of a selected strain of Acetobacter sp., ATCC 15164, were inoculated into a shake flask containing 500 ml. of the following inoculum medium and incubated at 30° C. with shaking for 18 hours:

| | Percent |
|---|---|
| Sorbitol | 2.0 |
| Glucose | 0.5 |
| Yeast extract | 0.5 |

A basal medium was prepared for production of 2-keto-L-gluconic acid. The medium had the following composition:

| | Percent |
|---|---|
| Sorbitol | 5.0 |
| Glucose | 0.5 |
| Yeast extract | 0.5 |
| $CaCO_3$ | 2.0 |

500 ml. of the incubated inoculum was added to 30 l. of the above medium in a fermentor having a total volume of 50 l. Incubation was conducted at 28–29° C. with stirring at the rate of 280 r.p.m., with aeration at the rate of 15–24 liters per minute, and with inner pressure at 15–20 lbs. per square inch. After 150 hours' incubation, a half amount of the culture broth was passed over Amberlite IR–120 (H-type) resin, decolorized with activated carbon and then concentrated. The resulting product was filtered out, and after washing with acetone, 60 g. of crystalline product were obtained.

(1) To 30 g. of the crystals thus obtained, 240 ml. of methanol and 0.3 ml. of 98% sulfuric acid were added. After the mixture was heated under agitation for three hours, methanol was removed. The residue was washed with a small amount of methanol and dried. The obtained product in 108 ml. of methanol was refluxed with about 8 g. of sodium methylate under heating. After cooling, the resulting crystals were filtered out and washed with a small amount of methanol to give 26.3 g. of sodium salt of L-ascorbic acid. 22.5 g. of L-ascorbic acid were obtained from the sodium salt of L-ascorbic acid.

(2) A mixture of 30 g. of the crystalline product obtained from the culture broth, 240 ml. of methanol and 6 g. of Amberlite IR–200 resin were heated under agitation for three hours. After the reaction, the resin was filtered off. Methanol was distilled off from the filtrate and the residue was washed with a small amount of methanol. Then, 22.5 g. of L-ascorbic acid were obtained in the same way as in the procedure (1) mentioned above.

Example 13

The residual half amount of the culture broth obtained in Example 12 was decolorized with activated carbon and the activated carbon was filtered off. The filtrate was passed over Amberlite IR–120 (H-type) and was dried under reduced pressure. The dried product was dissolved in 700 ml. of methanol. The solution was filtered after the treatment with 5.2 g. of activated carbon. To the filtrate, 0.9 ml. of 98% sulfuric acid was added. The mixture was heated under agitation for three hours. Then methanol was distilled off from the reaction mixture. The residue was washed with a small amount of methanol and then dried. Then in the same way as in the procedure (2) in Example 12, 22.5 g. of L-ascorbic acid was obtained. The same result was also obtained in the same way as in the procedure (2) in Example 12 except using 21 g. of Amberlite–200 in place of 0.9 ml. of 98% sulfuric acid.

Example 14

Cells of a selected strain of Acetobacter cerinus, grown on sorbitol-yeast extract agar slant, for 2 days at 28° C. were suspended in 10 ml. of sterile water. 5 ml. of this suspension was inoculated into 1 l. shake flask containing 150 ml. of the following aqueous medium, previously sterilized in an autoclave at 15 lbs. per square inch steam pressure:

| | Percent |
|---|---|
| Sorbitol | 5.0 |
| Glucose | 0.5 |
| Yeast extract | 0.5 |
| $CaCO_3$ | 2.0 |

Incubation was maintained at 28° C. with shaking at the rate of 225 r.p.m. for 10 days. After the culture broth was collected and treated with Amberlite IRA–400, it was concentrated and cooled. The resulting crystals were washed with acetone and then dried. 0.1 ml. of n-butanol, 0.45 ml. of water, 0.5 ml. of 35% hydrochloric acid and 18 ml. of benzene were added to the obtained crystals and the mixture was stirred at 64° C. for 16 hours. After the reaction, the resulting L-ascorbic acid was filtered out. The crude L-ascorbic acid was washed with a mixture of ethanol and benzene, and then recrystallized to give 5.2 g. of pure L-ascorbic acid.

Example 15

Cells of a mutant strain of Pseudomonas striafaciens were inoculated into a 2 l. shake flask containing 500 ml. of the following aqueous inoculum medium and incubated on a rotary shaker at 28° C.:

| | Percent |
|---|---|
| Sorbitol | 2.0 |
| Yeast extract | 0.5 |

Incubation was maintained at 28° C. with shaking at the rate of 200 r.p.m. for 24 hours. A basal medium was prepared for actual production of 2-keto-L-gulonic acid. The medium had the following composition:

| | Percent |
|---|---|
| Sorbitol | 5.0 |
| Yeast extract | 0.5 |
| Polypeptone | 0.2 |
| $K_2HPO_4$ | 0.1 |
| $MgSO_4 \cdot 7H_2O$ | 0.05 |

500 ml. of the incubated inoculum was added to 30.1 of the above medium in a fermentor having a total volume 50 l. Incubation was conducted at 28° C. with stirring at the rate of 260 r.p.m. and with aeration at the rate of 30 l. per minute for 7 days to obtain 27 l. of culture broth. The culture broth was filtered and the filtrate was treated with Amberlite IR–120 under reduced pressure to give 425 g. of the concentrated culture broth.

(1) A mixture of 250 g. of the concentrated culture broth, 600 ml. of ethanol, 300 ml. of benzene and 0.6 ml. of 98% sulfuric acid was heated under agitation. During the reaction, an azeotropic mixture consisting of water, ethanol and benzene was distilled off. The distillate separated into two layers and water of the lower layer was taken off from reaction system and the upper layer was brought into the reaction system. After the reaction, solvents were distilled off and the residue was washed with a small amount of ethanol and dried. The obtained product in 160 ml. of ethanol was refluxed with about 15 g. of sodium ethylate for 100 minutes. After cooling, the resulting crystals were filtered out to give 37.2 g. of sodium salt of L-ascorbic acid. 32 g. of L-ascorbic acid was obtained from the sodium salt of L-ascorbic acid.

(2) A mixture of 175 g. of the concentrated culture broth mentioned above and 5.3 ml. of 35% hydrochloric acid was heated at 75–80° C. for 5 hours. After the reaction mixture was decolorized, it was concentrated and dried at low temperature, preferably, to give crude L-ascorbic acid. The crude L-ascorbic acid was recrystallized with a small amount of water to give 7 g. of pure L-ascorbic acid.

*Example 16*

Cells of a mutant strain of *Pseudomonas coronafaciens* were inoculated in a similar way as in Example 15 to prepare 26 l. of culture broth. Thus prepared culture broth was treated in a similar way as the procedure (1) in Example 12 to obtain 58.5 g. of L-ascorbic acid.

*Example 17*

Cells of the following strains were incubated in a similar way as in Example 14. The obtained culture broth was treated in a similar way as in Example 12 to give L-ascorbic acid.

*Acetobacter suboxydans*, NRRL B–72
*Acetobacter gluconicus* ATCC 9324
*Acetobacter xylinum*, ATCC 10245
*Acetobacter albidus*, IFO 3250
*Acetobacter albidus*, IFO 3251
*Acetobacter albidus*, IFO 3253
*Acetobacter suboxydans*, IFO 3255
*Acetobacter industrius*, IFO 3260
*Bacterium orleanense*, IFO 3259
*Acetobacter cerinus*, IFO 3263
*Acetobacter cerinus*, IFO 3264
*Acetobacter cerinus*, IFO 3265
*Acetobacter cerinus* var. *ammoniacus*, IFO 3267
*Acetobacter cerinus* var. *ammoniacus*, IFO 3269
*Acetobacter cerinus*, IFO 3268

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

Having thus disclosed the invention, what is claimed is:

1. A method for producing 2-keto-L-gulonic acid, which comprises enzymatically transforming sorbitol directly to 2-keto-L-gulonic acid by the action of the enzyme system of a microorganism capable of converting sorbitol to 2-keto-L-gulonic acid and selected from the family Pseudomonadaceae, and recovering the so-produced 2-keto-L-gulonic acid.

2. A method for producing 2-keto-L-gulonic acid, which comprises enzymatically transforming sorbitol directly to 2-keto-L-gulonic acid by the action of the enzyme system of a microorganism capable of converting sorbitol to 2-keto-L-gulonic acid and selected from the group including the genus Pseudomonas and the genus Acetobacter, and recovering the so-produced 2-keto-L-gulonic acid.

3. A method for producing 2-keto-L-gulonic acid, which comprises enzymatically transforming sorbitol directly to 2-keto-L-gulonic acid by the action of the enzyme system of a microorganism capable of converting sorbitol to 2-keto-L-gulonic acid and selected from the genus Pseudomonas, and recovering the so-produced 2-keto-L-gulonic acid.

4. A method for producing 2-keto-L-gulonic acid, which comprises enzymatically transforming sorbitol directly to 2-keto-L-gulonic acid by the action of the enzyme system of a microorganism capable of converting sorbitol to 2-keto-L-gulonic acid and selected from the genus Acetobacter, and recovering the so-produced 2-keto-L-gulonic acid.

5. The method of claim 3, wherein the microorganism is Pseudomonas sp., ATCC 15165.

6. The method of claim 4, wherein the microorganism is a strain of *Acetobacter melanogenum*.

7. The method of claim 4, wherein the microorganism is Acetobacter sp., ACTT 15164.

8. The method of claim 4, wherein the microorganism is a strain of *Acetobacter cerinus*.

9. The method of claim 4, wherein the microorganism is a strain of *Acetobacter suboxydans*.

10. The method of claim 4, wherein the microorganism is a strain of *Acetobacter gluconicus*.

11. The method of claim 4, wherein the microorganism is a strain of *Acetobacter xylinum*.

12. The method of claim 4, wherein the microorganism is a strain of *Acetobacter albidus*.

13. The method of claim 4, wherein the microorganism is a strain of *Acetobacter industrium*.

14. A method for producing L-ascorbic acid, which comprises transforming sorbitol to 2-keto-L-gulonic acid by the action of the enzyme system of a microorganism selected from the group including the genus Pseudomonas and the genus Acetobacter, followed by subjecting the resulting 2-keto-L-gulonic acid to esterification, enolization and lactonization.

15. A method for the enzymatic production of 2-keto-L-gulonic acid directly from sorbitol which comprises subjecting the sorbitol to the action of the enzyme system produced by culturing a microorganism selected from the group consisting of

*Acetobacter melanogenus*, ATCC 15163 (IFO 3292)
Acetobacter sp., ATCC 15164
*Acetobacter rubiginosus*, IFO 3243
*Acetobacter suboxydans*, NRRL B–72
*Acetobacter gluconicus*, ATCC 9324
*Acetobacter xylinum*, ATCC 10245
*Acetobacter albidus*, IFO 3250
*Acetobacter albidus*, IFO 3251
*Acetobacter albidus*, IFO 3253
*Acetobacter suboxydans*, IFO 3255
*Acetobacter industrius*, IFO 3260

*Bacterium orleanense*, IFO 3259
*Acetobacter cerinus*, IFO 3263
*Acetobacter cerinus*, IFO 3264
*Acetobacter cerinus*, IFO 3265
*Acetobacter cerinus*, IFO 3266
*Acetobacter cerinus* var. *ammoniacus*, IFO 3267
*Acetobacter cerinus* var. *ammoniacus*, IFO 3269
and *Acetobacter cerinus*, IFO 3268 in a culture medium therefor containing the sorbitol, whereby the latter is directly converted into 2-keto-L-gulonic acid which accumulates in the said medium, and recovering thus-accumulated 2-keto-L-gulonic acid from the latter.

16. A method for the enzymatic production of 2-keto-L-gulonic acid directly from sorbitol which comprises subjecting the sorbitol to the action of the enzyme system produced by culturing a microorganism selected from the group consisting of

*Pseudomonas striafaciens*, IFO 3309
*Pseudomonas coronafaciens*, IFO 3310
and Pseudomonas sp., ATCC 15165 in a culture medium therefor containing the sorbitol, whereby the latter is directly converted into 2-keto-L-gulonic acid which accumulates in the said medium, and recovering thus-accumulated 2-keto-L-gulonic acid from the latter.

17. A method for the enzymatic production of 2-keto-L-gulonic acid directly from sorbitol which comprises subjecting the sorbitol to the action of the enzyme system produced by culturing Pseudomonas sp., ATCC 15165, in a culture medium therefor containing the sorbitol, whereby the latter is directly converted into 2-keto-L-gulonic acid which accumulates in the said medium, and recovering thus-accumulated 2-keto-L-gulonic acid from the latter.

18. A method for the enzymatic production of 2-keto-L-gulonic acid directly from sorbitol which comprises subjecting the sorbitol to the action of the enzyme system produced by culturing Acetobacter sp., ATCC 15164, in a culture medium therefor containing the sorbitol, whereby the latter is directly converted into 2-keto-L-gulonic acid which accumulates in the said medium, and recovering thus-accumulated 2-keto-L-gulonic acid from the latter.

19. A method for the enzymatic production of 2-keto-L-gulonic acid directly from sorbitol which comprises subjecting the sorbitol to the action of the enzyme system produced by culturing *Acetobacter melanogenus*, ATCC 15163, in a culture medium therefor containing the sorbitol, whereby the latter is directly converted into 2-keto-L-gulonic acid which accumulates in the said medium, and recovering thus-accumulated 2-keto-L-gulonic acid from the latter.

20. A method for the preparation of 2-keto-L-gulonic acid which comprises pre-culturing a 2-keto-L-gulonic-producing microorganism selected from the group consisting of the genus Pseudomonas and the genus Acetobacter, in an aqueous inoculum medium containing sorbitol, inoculating the thus-produced inoculum into a sorbitol-containing medium, culturing the microorganism in the latter, whereby an enzyme system is produced which directly converts the sorbitol into 2-keto-L-gulonic acid which accumulates in the last-named medium, and recovering thus-accumulated 2-keto-L-gulonic acid from the latter.

References Cited by the Examiner

UNITED STATES PATENTS

| | | | |
|---|---|---|---|
| 2,318,500 | 5/1943 | King et al. | 195—47 X |
| 3,043,749 | 7/1962 | Huang | 195—47 |

OTHER REFERENCES

Prescott et al.: Industrial Microbiology, 3rd ed., 1959, pp. 456–458.

A. LOUIS MONACELL, *Primary Examiner.*

L. M. SHAPIRO, *Assistant Examiner.*